United States Patent Office 3,282,097
Patented Nov. 1, 1966

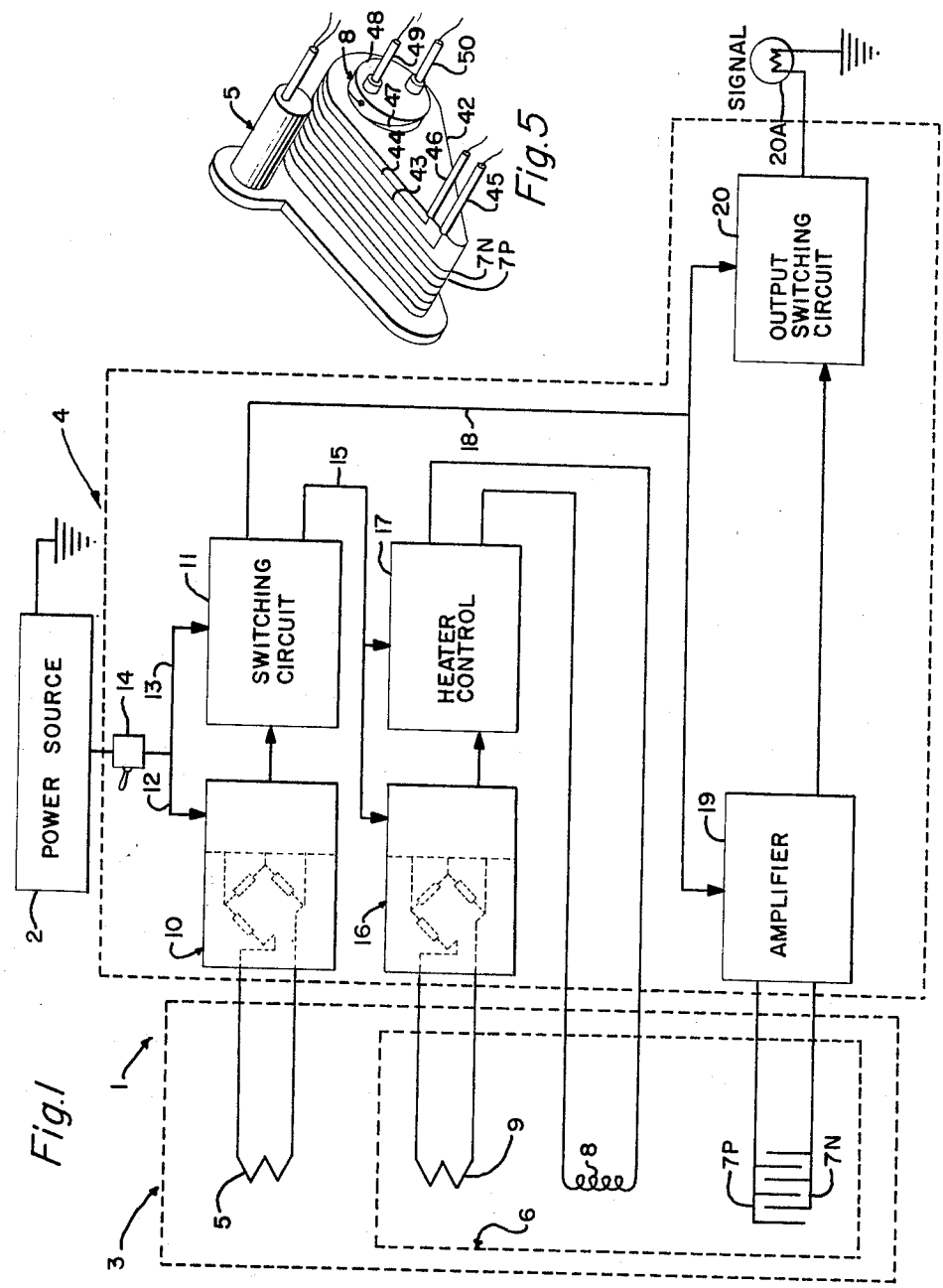

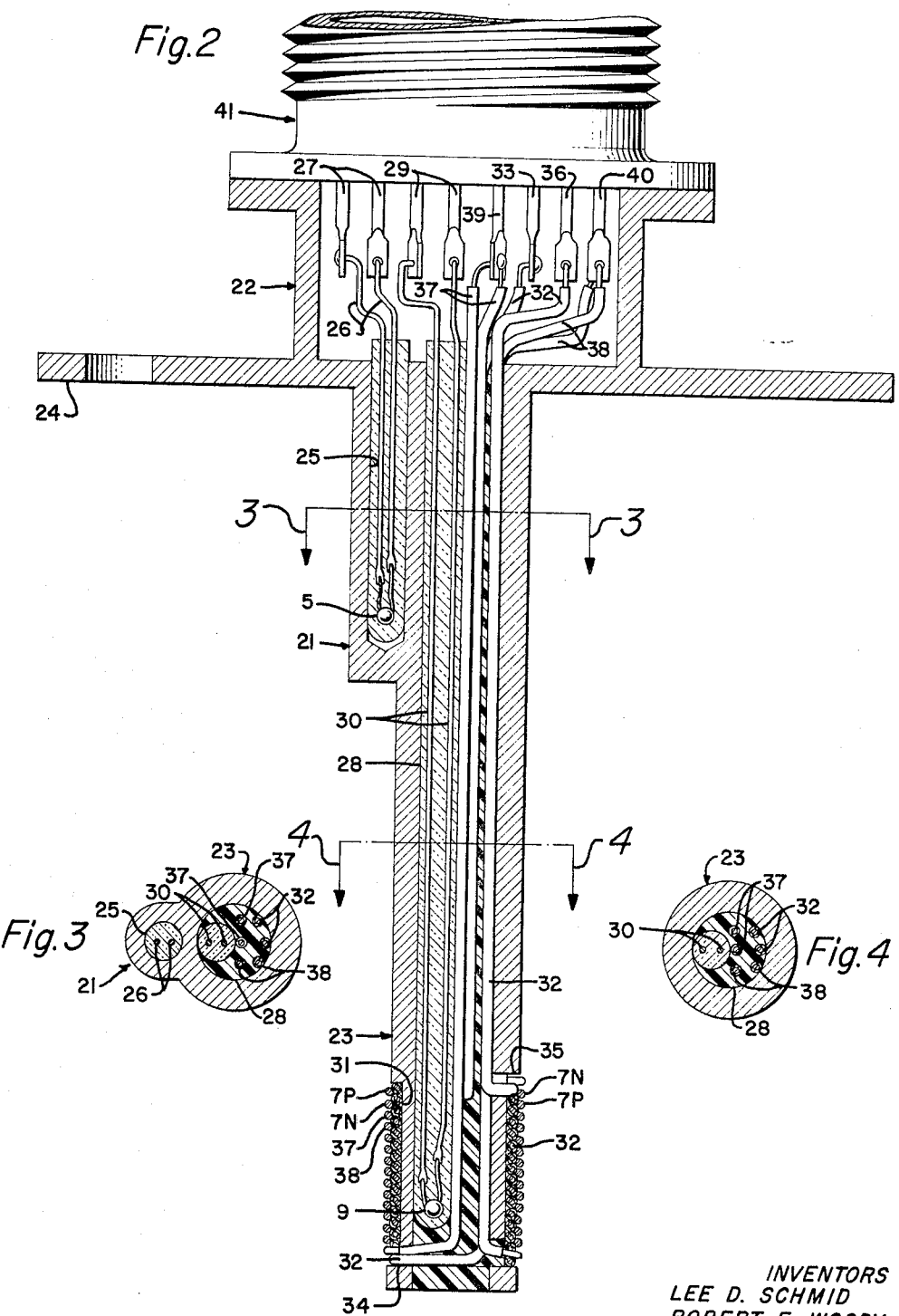

3,282,097
ATMOSPHERIC CONDITION SENSOR
Lee D. Schmid and Robert F. Woody, Phoenix, Ariz., assignors to The Garrett Corporation, Los Angeles, Calif., a corporation of California
Continuation of application Ser. No. 101,231, Apr. 6, 1961. This application Mar. 10, 1965, Ser. No. 438,626
6 Claims. (Cl. 73—170)

This application is a continuation of application Serial No. 101,231, filed April 6, 1961, now abandoned, entitled Atmospheric Condition Sensor.

The present invention relates generally to systems for detecting the presence of moisture or incipient icing conditions, and is more particularly directed to such systems having means responsive to predetermined conditions or changes therein in a space.

The principle of this invention relies in part on the electrical resistance differential between a dry atmosphere and a relatively wet one. This differential may be sensed by employing closely spaced electrodes to which a suitable electrical potential is applied. When the electrodes are dry and the applied voltage is lower than the breakdown level of dry air, no current will flow between the electrodes. When sufficient moisture is introduced to bridge the gap between the electrodes, a conductive path is formed which permits the flow of current from one electrode to the other. The current thus produced is used to initiate a signal in the system to indicate the presence of moisture between the electrodes.

It has been found that the above-described method will work well only when the moisture adjacent the electrodes is in a liquid state. Ice is a dielectric with resistance characteristics similar to dry air, and its presence cannot be sensed reliably with an electrical resistance change responsive element. It is necessary, therefore, that when systems employing electrode-type moisture sensors are operated in an atmosphere which is at water freezing temperatures or below, heat must be applied to the sensing element to prevent complete icing of the moisture on said element.

An important feature of this invention, therefore, is to provide novel heater means that will melt at least a portion of the ice which forms on the moisture sensing element, but will not tend to dry the entire element or inhibit the formation of water droplets on the sensor when moisture is still present in the atmosphere.

One form of the present invention utilizes a heater in combination with control means which varies the power to the heater in accordance with atmospheric temperature conditions to maintain a constant temperature adjacent the heater. The thermal energy, in this instance, is evenly distributed over the entire moisture sensor and maintained at a value which is just sufficient to prohibit ice formation.

Another form of the invention employs heating means having a constant power supply and unregulated thermal output, but is so positioned in the moisture sensing element as to produce a temperature gradient from one portion of the sensing element to another portion thereof. The extremes of this temperature gradient may range from boiling values or higher, adjacent the heater, to below a water freezing value at the point most remote from the heater.

The temperature gradient thus produced is utilized to provide an intermediate temperature value between these extremes, which value will permit liquid to form somewhere on the sensing element when moisture is present in the atmosphere.

The present system also incorporates an atmospheric temperature sensing device for use with either of the above-mentioned constructions which is constructed to produce a signal during predetermined conditions such as incipient freezing temperatures. This signal is used to energize the remainder of the system and provide a temperature reference which when combined with a signal from the moisture sensing element may give warning that moisture is present in an atmosphere which is nearly cold enough to produce icing conditions. The temperature reference signal may also be used to activate the heater during icing temperatures and inactivate the heater at temperatures higher than freezing.

An object of the invention is to provide a completely electrical device for detecting moisture in the atmosphere at temperatures below water freezing values.

Another object of the present invention is to provide a highly reliable condition responsive system with components which may be assembled into a small compact unit.

Another object of the invention is to provide an electrical moisture sensor having heater means disposed therein to produce a temperature gradient across the sensor.

A further object of the invention is to provide a condition responsive system employing the combination of a heated element having electrodes for sensing moisture caused changes in electrical resistance, and temperature responsive switch means for energizing said element during actual or incipient freezing temperatures.

A still further object of the invention is to provide an electrical moisture sensor having means associated therewith which converts signals initiated by temperature changes in the region adjacent the sensor into control signals which regulate the caloric output of a heater also associated with the sensor.

Other objects and advantages of the invention will become apparent with an understanding gained from the following detailed description and accompanying drawings, wherein:

FIG. 1 is a block diagram showing the essential elements of a circuit constructed in accordance with the principles of the present invention;

FIG. 2 is a longitudinal sectional view of a sensor component employed in the invention represented schematically in FIG. 1;

Figure 6:
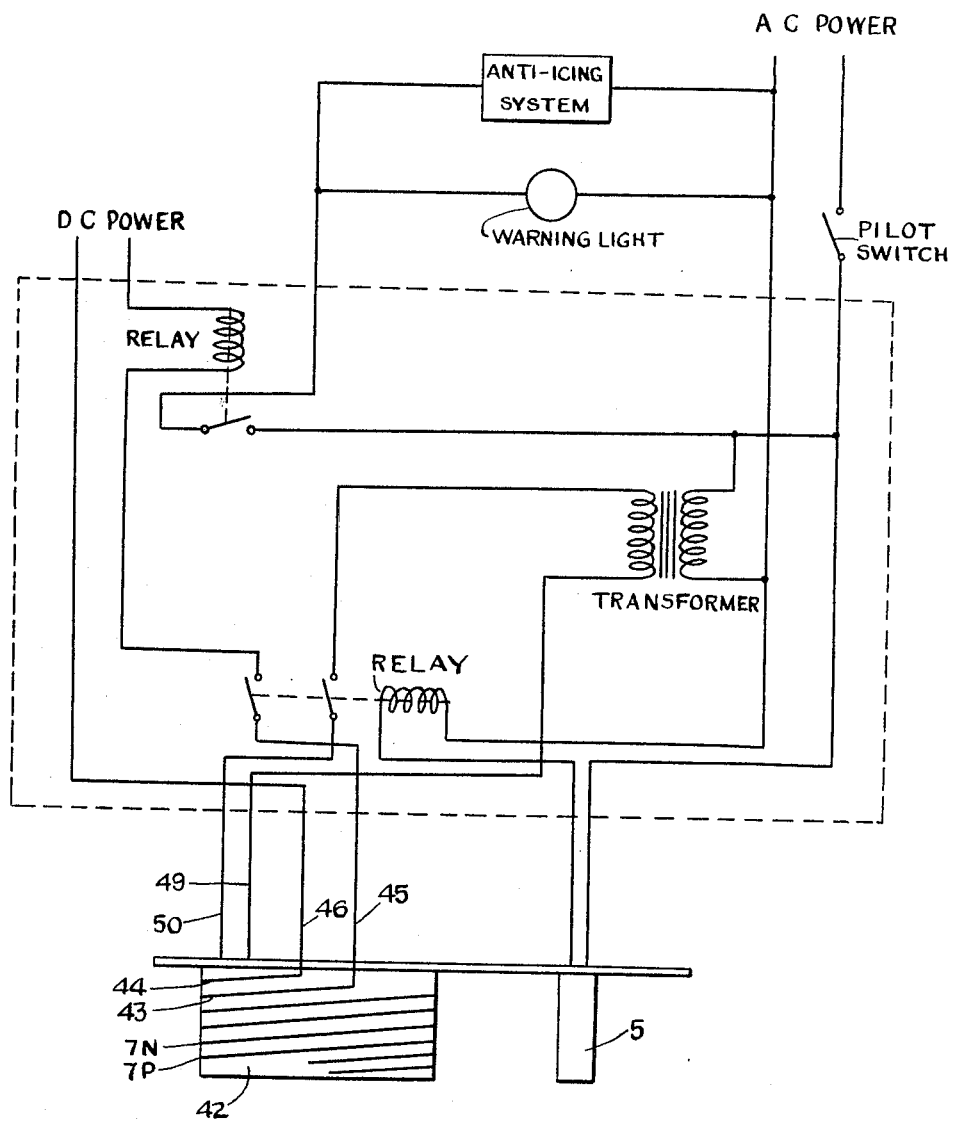

FIGS. 3 and 4 are detail horizontal sectional views taken through the sensor probe shown in FIG. 2 on the planes indicated by the lines 3—3 and 4—4, respectively, of such figure;

FIG. 5 is an isometric view showing an alternate form of sensor element; and

FIG. 6 is a block diagram showing the essential elements of a circuit used with the alternate form of sensor element shown in FIG. 5.

Referring to the drawings, FIG. 1 shows a circuit 1 which utilizes current from a suitable electrical power source 2. The circuit 1 may be considered generally as having two major components: first, a sensor component 3 which is exposed to atmospheric conditions, and second, a control component 4 which contains the circuitry for converting sensor produced signals into power signals for activating various parts of the system.

Schematically, the sensor component 3 comprises an atmospheric temperature responsive means in the form of a thermistor 5 and a moisture sensing element 6 which includes electrodes 7P and 7N in heat exchange relation with a heater 8. In one form of the invention a thermistor 9 is also employed to sense the output of the heater 8 and to produce a signal which is transmitted to that part of the control component 4 which regulates the power to said heater.

The control component 4 comprises a first bridge circuit 10 and a switching circuit 11 which are connected electrically by leads 12 and 13 to a manually operated switch 14, this latter-mentioned element being in direct electrical communication with the power source 2. The switching circuit 11 has one lead 15 connecting it to a second bridge circuit 16 and a heater control circuit 17. Another lead 18 connects the switching circuit 11 to an amplifier 19 and an output switching circuit 20 which controls the flow of electrical energy to a warning signal 20A or other device such as ice melting or removing means.

Although the two components 3 and 4 may be considered separately, it will be noted that the individual elements constituting the sensor component 3 are integral parts of the circuitry in the control component 4. The thermistor 5 forms one arm of the first bridge circuit 10 and the thermistor 9 is an arm of the second bridge circuit 16. The heater 8 is part of a system which makes up the control 17 and the electrodes 7P and 7N are extensions of circuitry in the amplifier 19.

It will be obvious from FIG. 1 that the control component 4 may be constructed by utilizing any one of a number of different conventional electrical parts without departing from the general scheme illustrated. The sensor component 3, however, comprises novel concepts which are embodied in the constructions shown in FIGS. 2 and 5.

The device illustrated in FIG. 2 employs all of the sensor elements shown schematically in FIG. 1 and comprises a body member 21 formed to include a terminal housing 22 and a probe or stem 23, said housing and probe extending in opposite directions from a mounting flange 24. The probe 23 is provided with an eccentric bore 25 which receives the thermistor 5, said thermistor being connected by leads 26 to terminal posts 27. A centrally located bore 28 is formed in the stem 23 to contain the thermistor 9 and some insulated electrical conductors, which will be subsequently discussed. This latter-mentioned thermistor is connected to terminal posts 29 by leads 30.

The stem 23 is also provided with a circumferential recess 31 at its outer end which serves as a receptacle for coils of wire that constitute the heater 8. The present heater comprises a loop of insulated electrical wire 32 of suitable length and gauge. One end of the wire 32 extends from a terminal post 33 through the bore 28 and out through an opening 34 formed in the wall of the probe 23. The wire 32 is wound in helical fashion in the recess 31 and inserted through an opening 35 to be returned through the bore 28 for attachment with a terminal post 36. The electrodes 7P and 7N are constructed from wires 37 and 38 of suitable length and gauge. A predetermined amount of insulation is stripped from an intermediate portion of each of these wires and the resultant bare section is wound in the grooves formed by the convolutions of wire 32. The electrode wires are so arranged that the coils of electrode 37 are disposed in alternate grooves between the heater coils, and the coils of electrode 38 are disposed in the grooves between the coils of electrode 37. This arrangement disposes the electrode coils in side-by-side spaced relationship. The insulated portions of both electrode wires 37 and 38 are inserted through openings provided in the stem 23 and pulled through the bore 28. Both ends of the wire 37 are soldered to a terminal post 39 and the other electrode wire 38 is similarly attached to another terminal post 40.

When the device represented in FIG. 2 is mounted for use the stem 23 is projected into an area which will expose it to the atmosphere under test, and if there is any motion to this atmosphere the thermistor 5 is preferably faced upstream. It will also be noted that all of the terminal posts employed by the device shown in FIG. 2 extend into a connector 41 which is constructed for attachment to a complementary connector that is associated with the control circuit 4.

FIG. 5 illustrates an alternate form of device having a wedge-shaped probe 42 which is formed from a fire resistant dielectric material of the type having relatively poor heat conducting properties. The probe 42 serves as a support for the electrodes 7P and 7N, which electrodes are wound on the tapering surfaces of said probe and comprise a set of uninsulated wires 43 and 44 disposed in spaced alternating coils. The electrode wires 43 and 44 are connected to insulated leads 45 and 46 which extend to a conventional connector (not shown) for attachment to the control component 4.

The heater 8 show in FIG. 5 is disposed at the thick end of the wedge-shaped probe 42 and comprises a coil of electrical wires 47 wound in helical fashion on a block 48 which may be made of any suitable heat resistant dielectric material. A pair of leads 49 and 50 extend from the heater 8 for connection with the control component 4.

The particular location specified of the heater in a probe having poor heat conductive properties provides a construction which will produce a temperature gradient of large differential across the probe. If this temperature gradient ranges from near boiling values for water to subfreezing levels for the same medium, there will be an intermediate temperature somewhere on the probe surface which is just sufficient to melt ice as it starts to form. Since the presence of only a small amount of moisture anywhere on the electrode portion of the sensor 3 will close a circuit between the electrode 7P and TN, a relatively small area having the proper temperature is sufficient to produce a signal. It will be apparent, therefore, that the construction shown in FIG. 5 permits the use of an unregulated heater in moisture sensing probes without sacrificing the advantage of having the exact temperature necessary for sensing moisture in the atmosphere at all ambient temperature conditions.

The system shown in FIG. 1 is put into condition for operation when the switch 14 is manually closed to permit the flow of current from the source 2 to the bridge circuit 10 and switching circuit 11. When electricity is supplied to the bridge 10 the thermistor arm 5 thereof will become temperature sensitive, whereby a temperature change in the ambient atmosphere will cause a proportionate change in the electrical conductivity of the thermistor 5 and tend to unbalance the bridge 10 to produce a signal. Temperature variations of the thermistor 5 in either direction will affect the bridge 10, a rise in temperature having one effect and a temperature drop producing the opposite effect. The present system may, therefore, be calibrated to transmit a signal which will energize the triggering circuit 11 at a predetermined value when the ambient temperature drops and will de-energize the circuit 11 at a predetermined value when the ambient temperature rises. In preparing the device for use in a cold atmosphere, it is necessary to calibrate the bridge circuit 10 to produce both signals at temperatures which are slightly above the freezing point of water.

When the switching circuit 11 is energized in response to one of the temperature produced signals, electrical current is allowed to flow from the power source 2 through conductors 15 and 18 to energize the remainder of the control component 4. The conductor 18 directs electrical power to the amplifier 19 and the output switching circuit 20. Part of this power is diverted to the electrodes 7P and 7N for applying oppositely polarized charges thereto.

The conductor 15 supplies electrical power to the heater control circuit 17 which is responsive to signals from the thermistor 9, whereby temperature variations of this thermistor will cause changes in the electrical balance of the bridge 16 which feeds a signal to the heater control circuit 17. The circuit 17 is constructed to control the amount of power supplied to the heater 8 and consequently the caloric output thereof in accordance with signals from the bridge circuit 16.

When the electrodes 7P and 7N are charged upon actuation of the switching circuit 11, a potential difference is established between said electrodes. As menitoned previously, if the ambient atmosphere around sensor component 3 is dry, a dielectric space separates the electrodes and no electrical current will flow therebetween. When the electrode portion of the sensor is exposed to moisture bearing air, some of the water droplets in the air will tend to collect on the electrodes and the space between said electrodes to provide an electrically conductive path which permits current to flow from one set of electrodes to the other. This flow of electricity will generate a signal in the amplifier circuit 19 which is transmitted to the output switching circuit 20 for completing a circuit to the warning signal or other device 20A. The circuit 20 will remain operative while the ambient temperatures are at or below the switching circuit triggering level and there is moisture between the electrodes 7P and 7N. If either the temperature signal originated by the thermistor 5 or the moisture signal from the electrodes 7P and 7N is interrupted, the output switching circuit 20 and device 20A will be inactivated. Reactivation of the circuit 20 will constitute a new cycle of operation.

It will be understood that the present system may also be employed simply as a moisture sensor which does not necessarily require the temperature reference provided by the thermistor 5 and its associated circuits. In this instance the thermistor 5, bridge circuit 10 and the switching circuit 11 are not utilized, and the leads 12 and 13 will extend directly from the switch 14 to the bridge circuit 16 and heater control 17. Operation of the sensor 6 without the temperature sensing circuitry is exactly as previously described except that the sensor is charged immediately after the switch 14 is closed and functions continuously, regardless of temperature changes, until said switch is opened.

If the form of sensor shown in FIG. 5 is employed without the temperature reference, the heater control means 17 is also eliminated to further simplify the system. In this last-mentioned instance, the electrodes 7P and 7N and heater 8 are connected directly to the switch 14, and said electrodes and heater are activated and inactivated by merely opening and closing the switch 14.

We claim:
1. A condition responsive system, comprising the combination of:
    (a) an electrical circuit having sensor means responsive to the electrical resistance differential between dry air and water to control said circuit;
    (b) heater means disposed adjacent said sensor means; and
    (c) control means adjacent and in direct heat exchange relationship with said sensor and heater means and effective during the use of the condition responsive system in an ambient freezing temperature to control the application of heat by said heater means to said sensor means to positively maintain at least a portion thereof at a temperature at which moisture will exist in a wet state between rapid vaporization and freezing phases.

2. A condition responsive system, comprising the combination of:
    (a) an electrical circuit having sensor means responsive to the electrical resistance differential between dry air and water to control said circuit;
    (b) heater means disposed adjacent said sensor means;
    (c) means in direct heat transfer relationship with said heater means and said sensor means operative during the use of the condition responsive system in an ambient freezing temperature to control the application of heat by said heater means to said sensor means to maintain at least a portion thereof at a temperature at which moisture will exist in a wet state between rapid vaporization and freezing phases; and
    (d) temperature responsive means for effecting the application of energy to said circuit during predetermined ambient thermal conditions.

3. A moisture sensor, comprising the combination of:
    (a) a body member formed from material having poor heat conducting properties;
    (b) electrodes disposed to border at least two sides of an elongated space on the surface of said body; and
    (c) heater means eccentrically disposed in said body to produce a temperature gradient from one end to the other of said elongated space.

4. A moisture sensor, comprising the combination of:
    (a) a wedge-shaped body member formed from dielectric material having poor heat conductive properties;
    (b) electrodes disposed to border at least two sides of an elongated space, said space being oriented to extend from front to back on at least one surface of said wedge-shaped body member; and
    (c) heater means disposed in the back end of said wedge-shaped body to produce a predetermined temperature gradient from one end to the other of said elongated space.

5. A probe for an atmospheric condition responsive system, comprising:
    (a) an elongated hollow dielectric body;
    (b) an electric heating element coiled about a portion of said body;
    (c) a moisture sensing element having first and second bare electrodes coiled about said heating element, said first and second electrodes being alternately disposed between the coils of said heating element and spaced a predetermined limited distance from one another;
    (d) a temperature sensing element disposed in said body intermediate the ends of the region occupied by said heating element and electrodes;
    (e) leads from said temperature sensing, said heating and said electrode elements extending through said hollow body; and
    (f) terminal posts joined with said leads adjacent the end of said body.

6. A probe for an atmospheric condition responsive system, comprising:
    (a) an elongated hollow dielectric body;
    (b) an electric heating element coiled about a portion of said body;
    (c) a moisture sensing element having first and second electrodes coiled about said heating element;
    (d) said first and second electrodes being alternately disposed between the coils of said heating element and spaced a predetermined limited distance from one another;
    (e) a temperature sensing element disposed in said body intermediate the ends of the region occupied by said heating element and electrodes;
    (f) a second temperature sensing element positioned in said body remotely from said first-mentioned temperature sensing element;
    (g) lead means extending from each of said elements and electrodes through said hollow body; and
    (h) terminal posts joined with said leads adjacent the end of said body.

References Cited by the Examiner

UNITED STATES PATENTS

| | | | |
|---|---|---|---|
| 2,571,605 | 10/1951 | Peters | 73—362 |
| 2,717,957 | 9/1955 | Ohlheiser | 73—170 X |
| 3,119,953 | 1/1964 | Kendall | 328—4 X |

LOUIS R. PRINCE, *Primary Examiner.*

D. O. WOODIEL, *Assistant Examiner.*